Patented Sept. 2, 1952

2,609,397

UNITED STATES PATENT OFFICE 2,609,397

PRIMARY ALCOHOL COMPOSITION

William F. Gresham, Wilmington, and Michael A. Kubico, Newark, Del., assignors to E. I. du Pont de Nemours & Company, Wilmington, Del., a corporation of Delaware No Drawing. Application July 24, 1948,
Serial No. 40,623

1 Claim. (Cl. 260—632)

This invention relates to novel primary alcohol compositions and more particularly to a highly branched, primary tridecanol composition which is of value in the manufacture of pesticidal compositions, plasticizers, thickeners, and surface-active agents.

For many years, important uses have existed for relatively high molecular weight alcohols, particularly those containing about 12 to 18 carbon atoms per molecule. To meet these important needs, especially in the detergent field, straight-chain alcohols have been manufactured on a rather large scale by hydrogenation of fatty acids or esters. Recently the use of synthetic detergents, including those of the sodium alkyl sulfate type, has markedly increased, and simultaneously supplies of natural fatty materials have become at times relatively scarce. The individual straight-chain primary alcohols have been difficult to synthesize in a practical way from low molecular weight, or readily available, non-fatty starting materials. Thus, a need has arisen for synthetic compositions which, like the hydrogenated fats, would be useful as intermediates in the manufacture of surface-active agents, and it has become evident that this need could not be satisfied by the synthesis of straight-chain, synthetic, primary alcohols from non-fatty materials by previously known methods. The very highly branched-chain primary alcohols, with which the present invention is concerned, were not known heretofore. Attempts have been made to employ certain synthetic branched-chain alcohols, especially secondary alcohols, for this purpose, and it has been reported that, in making surface-active agents, the secondary alcohols in which the alkyl groups are straight chain are markedly superior to those in which the alkyl groups are branched chain (U. S. 2,422,613; cf. also Ind. Eng. Chem. 35, 111 (1943)).

Since no suitable methods were known for the manufacture of very high branched primary alcohols of the kind described herein, it was not known what the effect of a very high degree of branching on the detergent properties of the $C_{13}$ primary alcohol sulfates would be; by analogy with the results reported for the secondary alcohol sulfates, however, one would have expected that the very highly branched tridecanols would be relatively ineffective as intermediates for alkanol sulfate type detergents.

It was known heretofore that olefinic hydrocarbons, for example olefinic lubricating oils (having about 100 carbon atoms per molecule) obtainable by polymerization of certain olefins in the presence of aluminum chloride, could be converted to the corresponding alcohols by reaction with carbon monoxide and hydrogen in the presence of a hydrogenation catalyst, followed by hydrogenation of the aldehydic product which is initially formed (U. S. 2,327,066). The resulting long-chain alcohols had very high molecular weights, and therefore differed quite markedly from the alcohols which had been found to be useful in the detergent field.

An object of the present invention is to provide, from readily available sources, a primary alcohol which is suitable for use in the manufacture of surface-active agents, and which is useful for other purposes. Another object is to prepare a highly branched tridecanol. Still another object is to obtain sulfates of such an alcohol. Other objects of the invention will appear hereinafter.

The present invention provides, as a novel composition of matter, a normally liquid, highly-branched primary tridecanol. This composition differs from previously known higher alcohols in a surprising manner. Since the tridecanol of this invention is very highly branched it is indeed quite remarkable that this tridecanol nevertheless can be converted to a sodium alkyl sulfate which has outstanding properties as a surface-active agent. This highly branched tridecanol surface-active agent also differs from the previously known straight-chain sodium alkyl sulfates of similar molecular weight in that it is readily soluble in organic solvents. For example, it dissolves readily in hydrocarbons such as benzene which are non-solvents for the straight-chain sodium alkyl sulfonates.

The invention is further illustrated by means of the following example.

*Example 1.*—Tetrapropylene (168 grams) was heated for one hour in a silver-lined reaction vessel of 325 cc. capacity at a temperature of 195° to 215° C. in the presence of a cobalt naphthenate catalyst (0.1 gram) with a gas consisting of carbon monoxide and hydrogen (molar proportions, ca. 1:1) under a pressure of 600 to 700 atmospheres. After cooling to room temperature, the reaction mixture was discharged from the shaker tube and distilled. The product yielded a fraction boiling at 53.5° to 70° C./12 mm. (which was an aldehyde fraction corresponding to $$C_{12}H_{25}CHO)$$

and an approximately equal quantity of a cut boiling at 75° to 129° C./12 mm., which was evidently a mixture of the said aldehyde, and the corresponding alcohol $C_{13}H_{27}OH$. These cuts were combined, and hydrogenated in the presence of a dioxane diluent at 150° to 160° C., using nickel-on-kieselguhr as the hydrogenation catalyst. The resulting mixture was distilled, the main fraction being collected at 103° to 112° C./4 mm. This fraction had a refractive index of 1.4460 at 25° C., and an —OH number of 268.9 (theory for $C_{13}H_{27}OH$, 280). The tridecanol thus obtained was converted to the sodium alkyl sulfate by reaction with chlorosulfonic acid ($CHCl_3$ diluent) followed by neutralization with sodium hydroxide. The resulting sodium alkyl sulfate was tested to determine its detergent properties. The results were as follows:

*Results of launderometer tests on Na primary tridecyl (highly branched) sulfate*

| Detergent | Concentration in water (grams/liter) | Reflectance (light reflected from washed test specimen, using 100 as light reflected from Mgo under same conditions) |
|---|---|---|
| 1. Na alkyl sulfate of above example | 0.15 | 40 |
|  | 0.10 | 42 |
|  | 0.15 | 44 |
|  | 0.25 | 46 |
|  | 0.35 | 51 |
| 2. Dodecyl sodium benzene sulfonate | 0.35 | 51 |

The tests set forth in Example 1 show that the sodium tridecyl sulfate prepared from the tridecanol of this invention is as effective a detergent as the well known outstandingly effective surface-active agents of the sodium alkyl aromatic sulfonate type.

It is to be understood that the foregoing example is illustrative only and that it should not be considered as limiting the invention. In the preparation of the $C_{13}$ aldehyde by carbonylation of tetrapropylene, the $CO:H_2$ ratio may be varied rather widely, and any suitable hydrogenation catalyst may be employed. Metallic cobalt, and cobalt salts, e. g. cobalt naphthenate, acetate, laurate, etc., have been employed successfully. Similarly, the $C_{13}$ aldehyde can be hydrogenated in the presence of any suitable hydrogenation catalyst without varying the nature of the $C_{13}$ alcohol which is obtained as a hydrogenation product. Any suitable method may be employed for purifying the $C_{13}$ alcohol; for example, pure $C_{13}$ alcohol can be obtained by reacting the impure product (ca. 80%) with boric acid, removing volatiles from the resulting borate at low pressure, then recovering the pure alcohol by hydrolysis followed by distillation. The sulfation of the alcohol can be carried out by any suitable method, and the neutralization of the sulfate may be accomplished by employing ammonia, ethanolamine, diethanolamine, triethanolamine, morpholine, lime, calcium carbonate, magnesia, magnesium carbonate, alkali metal hydroxides or any other similar neutralizing agent.

The tridecyl alcohol disclosed herein is valuable as an intermediate for the preparation of tridecyl halides, phthalates, phosphates, silicates, adipates, glutarates, acetates, etc. The high boiling esters of this tridecanol are useful as plasticizers for vinyl resins, including polyvinyl chloride and polyvinyl chlorideacetate. Polymeric tridecyl acrylates and alkacrylates are useful as thickeners for lubricating oils.

Since the procedure for carbonylation of tetrapropylene, and for hydrogenation of the resulting $C_{13}$ aldehyde, may be varied rather widely without altering the properties of the tridecanol thus obtained, it is to be understood that we do not limit ourselves except as set forth in the following claim.

We claim:

Normally liquid, highly branched primary tridecanol, characterized in that it has a boiling point in the range of 103° to 112° C., at a pressure of 4 mm., and characterized further in that it is a hydrogenation product of the highly branched $C_{13}$ aldehyde obtained by simultaneous reaction of carbon monoxide and hydrogen with tetrapropylene in the presence of a hydrogenation catalyst.

WILLIAM F. GRESHAM.
MICHAEL A. KUBICO.

REFERENCES CITED

The following references are of record in the file of this patent:

UNITED STATES PATENTS

| Number | Name | Date |
|---|---|---|
| 2,403,524 | Hagemann | July 9, 1946 |
| 2,415,102 | Landgraf | Feb. 4, 1947 |
| 2,418,899 | Pevere | Apr. 15, 1947 |
| 2,530,989 | Parker | Nov. 21, 1950 |

OTHER REFERENCES

Fiat Final Report No. 1000; PB–81383, Dec. 26, 1947, p. 39.

"Report on the Petroleum and Synthetic Oil Industry of Germany," B. I. O. S. Overall Report No. 1, London (1947), p. 101-2.